3,150,183
PREPARATION OF ALICYCLIC AMINES FROM ALICYCLIC ISOTHIOCYANATES
George A. Buntin, Wilmington, Del., assignor to Hercules Powder Company, Wilmington, Del., a corporation of Delaware
No Drawing. Filed Jan. 5, 1962, Ser. No. 164,616
7 Claims. (Cl. 260—563)

This invention relates to the conversion of an organic isothiocyanate to an organic amine.

Methods of conversion of an organic isothiocyanate to an amine by acid hydrolysis and by alkaline hydrolysis are known.

In accordance with the present invention it has now been found that improved yields of amine are obtained by reacting an organic isothiocyanate with elementary chlorine and water.

The process of this invention is generally applicable for conversion of an organic isothiocyanate of the general formula RSCN to an amine of the formula $RNH_2$, where R is an organic radical.

The process of this invention is illustrated by the following examples wherein all parts and percentages are by weight.

Example 1

2-norbornylisothiocyanate was prepared by adding 30 parts 75% sulfuric acid dropwise over a two-hour period with stirring to a suspension of 28.2 parts norbornylene and 29.1 parts crushed potassium thiocyanate in 130 parts toluene at 35–40° C. and continuing stirring for an additional 3 hours. This resulted in the formation of HSCN in situ and the addition thereof to the double bond of the norbornylene. The organic layer was separated and 2-norbornylisothiocyanate boiling at 74–80° C./0.3 mm. recovered therefrom.

To 30 parts of 2-norbornylisothiocyanate in 200 parts of glacial acetic acid containing 4 parts water at 20–30° C. was added 28 parts of chlorine gas with stirring over a 30-minute period. The acetic acid was distilled off at reduced pressure up to a pot temperature of 50° C. at 30 mm. The white solid residue was diluted with hexane, filtered off, washed with hexane, and dried. Twenty-six parts of white crystalline powder was obtained. It analyzed 9.6% N and 22.8% Cl compared to the calculated values of 9.5% N and 24.1% Cl for norbornylammonium chloride. To 250 parts of water at 60° C. was added 24.5 parts of norbornylammonium chloride. The resulting solution was filtered to remove 0.3 part of brown, insoluble material. The filtrate was made basic with NaOH, and extracted twice with 160 parts each of benzene. The benzene extracts were combined, dried over $Na_2SO_4$, and distilled. Twelve parts of water-white liquid was collected at 55–56° C. at 25 mm. pressure. It had a neutral equivalent of 111.9 compared to a calculated value of 111.5 for 2-norbornylamine. Another preparation distilled at 53–55° C./18 mm. and had a refractive index $N_D^{20} = 1.4849$.

Example 2

Cyclopentadiene was reacted with propylene in the Diels-Alder reaction to produce methylnorbornylene, and this was reacted with HSCN as in Example 1, and the resulting 2-(6-methylnorbornyl)isothiocyanate was treated with chlorine as in Example 1. The amine produced was 2-(methylnorbornyl)amine, B.P. 70–74/22 mm.

Example 3

Cyclopentadiene was reacted with butene-2 in the Diels-Alder reaction to produce 5,6-dimethylnorbornylene, and this was reacted with HSCN as in Example 1. The resulting 2-(5,6-dimethylnorbornyl)isothiocyanate was treated with chlorine as in Example 1. The amine produced was 2-(5,6-dimethylnorbornyl)amine, B.P. 76–78/16 mm., $N_D^{20} = 1.4865$.

Example 4

Cyclopentadiene was reacted with pentene-1 in the Diels-Alder reaction to produce propylnorbornylene, and this was reacted with HSCN as in Example 1. The resulting 2-(propylnorbornyl)isothiocyanate was treated with chlorine as in Example 1. The amine produced was 2-(propylnorbornyl)amine, B.P. 38–40° C./0.25 mm.

Example 5

Cyclopentadiene was reacted with butene-1 in the Diels-Alder reaction to produce ethylnorbornylene, and this was reacted with HSCN as in Example 1, and the resulting 2-(ethylnorbornyl)isothiocyanate was treated with chlorine as in Example 1. The amine produced was 2-(ethylnorbornyl)amine, B.P. 38–40° C./0.8 mm., $N_D^{20} = 1.4792$.

Example 6

Cyclopentadiene was reacted with allyl chloride in the Diels-Alder reaction to produce chloromethylnorbornylene, and this was reacted with HSCN as in Example 1. The resulting 2-(chloromethylnorbornyl)isothiocyanate was treated with chlorine as in Example 1, and the resulting amine salt was converted to the free amine. The 2-(chloromethylbornyl)amine obtained was distilled at 64–68° C./0.25 mm., refractive index $N_D^{20} = 1.5112$.

Example 7

Cyclopentadiene condensed with vinyl chloride in the Diels-Alder reaction formed chloronorbornylene which was reacted with HSCN as in Example 1, and the resulting chloronorbornyl-2-isothiocyanate was treated with chlorine as in Example 1, and the resulting amine salt was converted to the free amine. The 2-(chloronorbornyl)-amine obtained was distilled at 65–68° C./0.5 mm.

Example 8

Tetrahydrodicyclopentadienylisothiocyanate was chlorinated as in Example 1 in acetic acid containing a small amount of water. Tetrahydrodicyclopentadienylamine was recovered from the hydrochloride produced in this reaction. It was a water-white liquid, B.P. 84–86/1 mm., $N_D^{20} = 1.5178$.

The process of this invention, when applied to organic isothiocyanates of the formula RSCN, where R is any organic radical carrying no interfering functional groups, produces the corresponding amine $RNH_2$. By way of further examples, the following isothiocyanates produce the corresponding amines:

Cyclohexylisothiocyanate yields cyclohexylamine
p-menthanylisothiocyanate yields p-menthanylamine
Dichloronorbornylisothiocyanate yields dichloronorbornylamine The organic radicals which carry no interfering functional groups are cyclic alkyl groups and their halogen, amino, nitro, hydroxyl, ether, keto, and carboxyl substitution products. Interfering functional groups which are absent are ethylenic double bonds, acetylenic triple bonds, aryl groups and mercapto groups.

The process of this invention appears to involve two main reactions as follows:

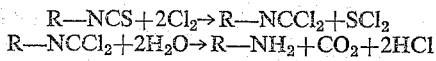

and these reactions may be carried out stepwise by first chlorinating in the absence of water and then hydrolyzing by reaction with water, or both reactions may be carried out simultaneously. Unless a completely anhydrous system is used in the chlorination, the second reaction will take place to the extent that there is sufficient water present. When glacial acetic acid is used as a solvent in complete absence of water, it is possible that there is an intermediate reaction in which acetic acid adds to $RNCCl_2$, forming, for example,

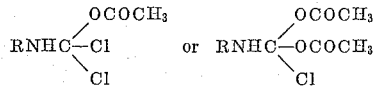

which on subsequent addition of water hydrolyzes to the amine, hydrochloric acid, carbon dioxide and acetic acid. When carbon tetrachloride is used for the chlorination solvent, the compound $RNCCl_2$ can be isolated by distilling off the by-product $SCl_2$ and carbon tetrachloride. The hydrolysis step can be carried out as a subsequent step by contacting this intermediate with water in the chlorination solvent or in a different solvent or in the absence of a solvent. The mechanism of the reaction is not important, however, except for making obvious variations in which reaction takes place with chlorine and subsequently with water whether water is present during the chlorine addition or is added after the intermediate chlorination product is formed.

The amount of chlorine and water required for the reaction is, as expressed in the above equations, two moles each of chlorine and water for each —NCS group present. An excess of either may be used, but only the theoretical amount reacts in the process of this invention.

The process of chlorination may be carried out in water or dilute hydrochloric acid as, for instance, in chlorine water or Javelle water, or in water-free or water-containing organic solvents such as acetic acid, chloroform, carbon tetrachloride, ethyl chloride, ethylene chloride, methylene chloride, hexane, benzene, toluene and xylene. In general, the volatile organic acids, aliphatic hydrocarbons, aliphatic chlorohydrocarbons, cyclo-paraffins, and aromatic hydrocarbons are particularly suitable. The same solvents are useful in the hydrolysis step. Where both chlorination and hydrolysis are carried out simultaneously, it is preferable to use a lower fatty acid such as acetic acid which is a solvent for both the organic reagent and the water.

The reaction of the organic isothiocyanate with chlorine is carried out by contacting the organic isothiocyanate with elementary chlorine at a temperature above —50° C. and below that at which the desired amine is destroyed. The preferred temperature for an anhydrous system, or when water is present, is 0 to 50° C., but temperatures as high as 100° C. and as low as —50° C. are operable.

The reaction of the unhydrolyzed chlorination product with water takes place in the same temperature range, and this range may be broadened to —50° C. to 150° C. when carried out separately from the chlorination step.

The amine salt may be recovered in many ways other than by distilling off the solvent, as will be obvious, and is not limited to distillation. The salt may be rendered insoluble, for example, by addition of propane, or hexane, and separated by filtration, and the propane may then be distilled off so that the mother liquor can be reused.

The free amine can be separated from the amine hydrochloride by treatment with alkalies or by ion exchange resins. In some cases where the amine is steam volatile, it can be steam distilled from an aqueous alkaline solution. An alkali or alkaline earth hydroxide or carbonate may be used to neutralize the hydrochloric acid so as to liberate the free amine. These methods are well known in the art of liberating free amine from amine hydrochlorides.

The process of this invention is particularly desirable for the preparation of amines not readily produced by other methods. The isothiocyanates used as reagents are readily produced in many instances by the addition of HSCN, produced in situ, to the unsaturated compound corresponding to the desired organic radical. This is a particularly useful method for producing amines in which the organic radical is a norbornyl ring having an amine group in the 2-position on the norbornyl ring. A variety of such amines is produced by reacting cyclopentadiene with substituted and unsubstituted hydrocarbons having one double bond to produce compounds having the norbornylene ring, adding HSCN to these norbornylene compounds to form the isothiocyanate, and then treating the resulting organic isothiocyanate with chlorine and water.

This application is a continuation-in-part of application Serial No. 75,917, filed December 15, 1960, which in turn is a continuation-in-part of application Serial No. 5,670, filed February 1, 1960, and now abandoned, by George A. Buntin and William R. Diveley.

What I claim and desire to protect by Letters Patent is:

1. The method of preparing an amine of the formula $RNH_2$ where R is an alicyclic organic radical selected from the group consisting of the saturated hydrocarbon radicals and chlorohydrocarbon radicals which comprises contacting an alicyclic organic isothiocyanate with elementary chlorine and water at a temperature in the range of 0° C. to 100° C. until $RNH_2 \cdot HCl$ is formed and separating $RNH_2$ therefrom.

2. The method of claim 1 in which R is the norbornyl radical.

3. The method of claim 1 in which R is the chloromethylnorbornyl radical.

4. The method of claim 1 in which R is the chloronorbornyl radical.

5. The method of claim 1 in which R is the methylnorbornyl radical.

6. The method of claim 1 in which R is the dimethylnorbornyl radical.

7. The method of claim 1 in which R is the p-menthanyl radical.

References Cited in the file of this patent

Sell: Ber. Deut. Chem., vol. 7, pp. 1228–1234 (1874) QD1D4.

Bly et al.: J.A.C.S., vol. 44, pp. 2896–2903 (1922).